May 20, 1952  W. C. EKHOLM ET AL  2,597,232
MANUFACTURE OF CARBON BLACK
Filed March 23, 1948  3 Sheets-Sheet 1

INVENTORS
Wesley C. Ekholm
George L. Heller
BY
Pennie, Edmonds, Morton & Barrows
ATTORNEYS Patented May 20, 1952

2,597,232

UNITED STATES PATENT OFFICE 2,597,232

MANUFACTURE OF CARBON BLACK

Wesley C. Ekholm, Brooklyn, N. Y., and George L. Heller, Monroe, La., assignors to Columbian Carbon Company Application March 23, 1948, Serial No. 16,585

14 Claims. (Cl. 23—209.4)

The present invention relates to the manufacture of furnace blacks and provides an improved furnace black process of the general type described in the Wiegand and Braendle Patent #2,378,055.

The process of said patent is a practical application of a new principle of carbon black furnace operation, namely, the generation at one end of an elongated, unobstructed and unconstricted reaction chamber of a hot, high velocity, violently turbulent blast flame, the forceful injection into the blast flame gases as they pass through the reaction chamber, at a point or points near the blast end of the chamber, of a stream or streams of additional hydrocarbon gas (apart from the blast fuel), known as "make gas," which is substantially instantaneously, thoroughly and uniformly mixed with hot blast flame gases and is decomposed by their heat into carbon black, the whole reaction being carried out while the admixed make gas and blast flame gases continue their passage at high velocity and turbulence through the previously mentioned elongated reaction chamber.

In the operation of large commercial scale units based on the invention of the patent, certain difficulties have arisen. Our present invention provides improvements particularly with respect to the method of injecting the hydrocarbons to be decomposed, herein referred to as make gas, into the blast flame gases whereby a greater nicety of control of the characteristics of the resultant furnace black and greater economy in raw materials are attained. The invention also provides an improvement process whereby a furnace black embodying the characteristics of extremely fine particle size and high structure may, with advantage, be produced.

In carrying out the process described in the patent, the make gas is injected at a high velocity into the turbulet stream of blast flame gases, roaring through the furnace at a high linear velocity, usually in excess of 50 feet per second, and is uniformly mixed with the blast flame gases and thereby heated to its decomposing temperature in an immeasurably brief period of time.

Our present invention is predicated upon our discovery that the efficiency of the process, and the character of the product, are materially influenced by the manner of injecting the make gas into the stream of blast flame gases. The entering jets of make gas maintain their identity for an extremely short time despite the turbulent flow conditions in the reaction chamber, and the physical dimensions, arrangement and behavior of these streams during this brief interval are of major importance with respect to the yield and character of the product.

Thus, it is generally advantageous with respect to yield and uniformity of product, particularly in large sized units, that the entering make gas jets retain their identity long enough to penetrate a sufficient distance into the stream of blast flame gases to assure uniform dispersion of the make gas upon final dissipation of the streams. The time interval over which the entering make gas streams maintain their identity is so short as to be immeasurable by available means, as previously noted, but is to the best of our knowledge of the order of micro-seconds.

We have found that too rapid dissipation or shattering of the make gas stream is unfavorable to both quality and yield. Also, a violent mushrooming collision of two make gas streams appears to be inimical to carbon chain structure required for optimum performance of a carbon black in synthetic rubber compounding.

In furnaces of excessive width, yield is sacrificed. Excessive spacing between make gas streams injected from opposite sides of the furnace, with a consequent channelling of the blast products down through the center of the furnace, is to be avoided. Excessive spacing between adjacent make gas streams is also to be avoided, apparently because large quantities of the hot blast gases pass between the rigid make gas streams adjacent the furnace wall and are not efficiently employed. The diameter of the make gas streams, the spacing between adjacent make gas streams, the trajectory of the streams, and the composition of the make gas are of major importance.

The interrelationship of these various factors (make gas stream diameter, trajectory, spacing between adjacent streams, furnace width and ratio of the mass velocity of the entering make gas streams to the mass velocity of the blast gas streams, as well as the composition of the make gas) is of such complexity as to defy rational explanation on the basis of single variable effects. However, an appreciation and coordination of these various factors, as hereinafter described, has resulted in the present particularly valuable improvements over earlier furnace processes of this general type.

In order to promote more rapidly a uniform mixing of the make gas with the blast flame gases, it has been proposed to inject the make gas into the stream of blast flame gases in a direction substantially perpendicular to the direction of flow of the latter, or at some substantial angle not less than about 30° from the direction of flow of the blast flame gases through the chamber. The present process also utilizes this principle which has been designated "right angle make." However, some deviation from the perpendicular is likewise contemplated.

In accordance with our present invention, the desired uniformity of mixing of the make gas with the blast flame gases is even more rapidly and successfully attained by injecting the make gas into the stream of blast flame gases as a plurality of relatively fine streams directed across the stream of blast flame gases and so controlling the trajectory of the small streams and the angle of spread of the small streams as to avoid any substantial overlapping of, or excessive spaces between, the make gas streams through which the blast flame gases might pass without encountering the make gas, and also to prevent contact between the make gas and the chamber walls prior to adequate dilution with the blast flame gases.

The trajectory of the make gas streams is dependent upon the relationship between the mass velocity of the make gas streams and the mass velocity of the stream of blast flame gases. The respective mass velocities cannot, however, be varied indiscriminately because of other practical process requirements. For instance, the yield and properties of the product are influenced by the amount of make gas injected. The mass velocity of the blast flame gases is, on the other hand, subject to the tremendous heat requirement of the process, which heat is supplied, primarily at least, by combustion of the fuel gas. Further, the generation of the heat must be extremely rapid and is usually of the order of 2 to 3 million B. t. u. per hour per cubic foot of combustion space, the temperature at the upstream end of the chamber at the point of make gas injection usually being about 2,400° to 2,750° F. The temperature of the resultant mixture is also of primary importance and a high degree of turbulence must be maintained throughout the chamber.

According to the present process, the blast flame gases are, with advantage, passed through a reaction chamber of generally rectangular cross-section having at least one relatively narrow dimension, herein referred to as width, and of substantially greater length. The make gas is injected from opposite sides across the width of the chamber as a plurality of relatively small streams, uniformly spaced over the entire height and equi-distant from the ends of the chamber. The width of the chamber should not exceed about 18 inches and is, with advantage, somewhat less. Chamber widths of 12 to 14 inches have been found particularly advantageous under most conditions.

The ratio of the mass velocity of the make gas streams to the mass velocity of the blast flame gases should be within the range of 3:1 to 10:1, the optimum ratio varying somewhat with the width of the furnace, as just indicated. With a furnace 12 inches in width, ratios within the range of 5.5:1 to 9:1 have been found particularly advantageous.

It is generally advantageous to inject the make gas through tubes of circular transverse section of about ½ inch in diameter, spaced about 2½ inches between centers, but this diameter may be varied somewhat, the optimum diameter of the make gas streams being dependent upon the spacing between the tubes and the mass velocity at which the make gas is to be injected. The spacing between the make gas injection tubes should be so correlated with the mass velocity as to give a uniform pattern of make gas along the entire height of the chamber.

Close spacing of the make gas streams promotes more efficient use of the hot blast flame gases by preventing excessive by-passing of the hot flame gases between adjacent jets of make gas and more effective mixing of the make gas and blast flame gases is thereby promoted. At the same time, the increased number of jets makes possible the use of smaller diameter tubes in developing velocities necessary to effect the required penetration of the make gas streams into the stream of blast flame gases and provides more rapid uniform heating as well as dispersion of the make gas.

Figure 1:
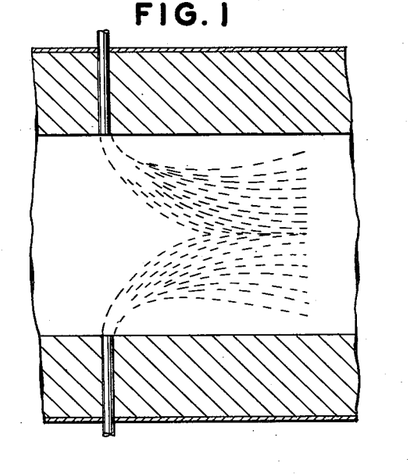
Figure 2:
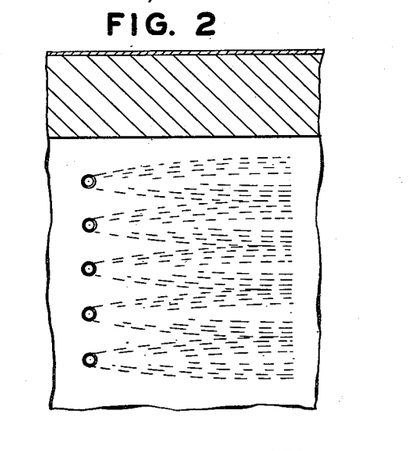

The trajectory of the make gas streams and the pattern formed thereby across the reaction chamber, in accordance with the present process, are diagrammatically represented by Figures 1 and 2 of the accompanying drawings. As appears from Figure 1, the trajectory is such that the opposite streams just meet at the center line of the chamber and, as shown by Figure 2, the spacing between adjacent streams and their angle of spread are such that uniform distribution is achieved.

We have found that, as the diameter of the make gas stream approaches ¾ inch, it becomes increasingly difficult to effect the desired make gas pattern across the reaction chamber and the optimum rate of mixing of make gas and blast gases. We, therefore, restrict the diameter of the make gas streams to a maximum between ½ and ¾ of an inch. At diameters less than about ¼ inch, the make gas streams, at acceptable operating loads, become too readily shattered, i. e., before adequate penetration of the blast gas stream, and a condition ensues where the make gas concentration across the width of the furnace does not reach uniformity until after the onset of cracking, which condition it is one of the objects of this invention to avoid. Likewise with very small make tubes a coking up and plugging of the make tubes may become a serious operating problem with certain types of hydrocarbon raw material.

The invention is not restricted to the use of round make gas streams. Square or somewhat flattened streams of corresponding transverse area may be used so long as their upstream-downstream thickness is within the range of ¼ to ¾ inch and their mass velocity is sufficiently great to avoid the too rapid shattering just described, with resultant non-uniformity of mixing.

Apparatus particularly adaptable to changes in the characteristics of the product, within reasonably broad limits, has been constructed having a reaction chamber width of about 12 inches and a height of about 4 feet and using make gas injection tubes ½ inch in diameter, uniformly spaced along each side of the chamber over its entire height and about 2½ inches between centers.

Reaction chambers of somewhat greater height may be employed, say, 5 to 6 feet in height, but as the height approaches 5 or 6 feet, difficulties are encountered due to the thermal head in the chamber.

The time period over which the make gas and decomposition products thereof are subjected to the temperature of the blast flame gases in the reaction chamber, herein referred to as "contact time" is, of course, dependent upon the linear velocity of the gas mixture through the chamber and the length of the chamber. In the present process the contact time is, with advantage, not over about one-half second, preferably about 0.4 second or less, but may be varied somewhat depending upon the desired characteristics of the product. At the end of the predetermined contact time, the mixed gases including the furnace black in suspension are rapidly cooled, as by means of a water spray, to a temperature at which the characteristics of the resultant furnace black is not materially changed under operating conditions, usually to a temperature below 2,000° F. This cooling may be effected as the effluent gases pass from the reaction chamber. However, under some conditions, it has been found advantageous to employ cooling sprays within the furnace proper to reduce the temperature of the gaseous mixture to a greater or less extent before it leaves the reaction chamber. By this means, the desired contact time, and greater flexibility as to contact time, may be attained in a given apparatus and the characteristics of the resultant furnace black thereby materially altered.

As previously noted, an important aspect of the present process is the maintenance of the stream of gases passing through any particular section of the reaction chamber of uniform temperature, composition and linear velocity over its entire transverse area. This is, with advantage, promoted by producing the blast flame by blasting a plurality of streams of fuel gas and an oxygen-containing gas, advantageously air, into the upstream end of the reaction chamber through a large number of blast burner ports of relatively small diameter uniformly spaced over the entire transverse area of the chamber. It has been found that, for this purpose, burner ports of about 1 inch to 1⅝ inches in diameter and aggregating about 25% of the entire area of the burner block may be used with advantage. A blast burner of the type described and claimed in the copending application of one of us, Ser. No. 2,399, filed January 15, 1948, now Patent No. 2,529,873, has been found especially advantageous, though the process is not restricted to this particular type of burner.

According to a particularly desirable modification of the invention, we use as the make gas, natural gas enriched by admixing therewith a relatively small proportion of heavier hydrocarbons, advantageously a liquid hydrocarbon fraction having an end point not in excess of about 725° F., preferably a hydrocarbon distillate, or one relatively free from difficultly vaporizable residuum. Such heavier hydrocarbons are, with advantage, sprayed into natural gas passing to the system for use as make gas. The natural gas is, with advantage, preheated to a temperature above the end point of the enriching oil prior to the adding of the oil so as to ensure complete vaporization. The enriching oil may also be preheated but care should be exercised to avoid decomposition of the oil with resultant coking of the feed lines. By thus enriching the make gas, the yield of furnace black is materially increased and the characteristics of the product may be substantially influenced.

These heavier hydrocarbons appear to be less readily mixed uniformly with the blast flame gases than are the lighter hydrocarbons and, where used, there is frequently a tendency toward lack of uniformity of the product. Difficulties previously encountered where make gas enrichment was used are avoided by the make gas injection method herein described and the use thereof with make gas enrichment constitutes an important aspect of the present invention. For instance, the use as the make gas of natural gas enriched by the addition of heavier hydrocarbons has been found to have the tendency to produce a furnace black of increased particle size. In accordance with our present process, the advantages of enrichment in producing high structure characteristics and higher yields are attained while still maintaining extremely small particle size.

With respect to this aspect of the invention we have found it particularly advantageous, where a carbon black having high structure characteristics is desired, to enrich the natural gas customarily used as the make gas by mixing therewith a hydrocarbon distillate, such as previously described, which contains relatively large proportions of unsaturates and aromatics, especially fractions characterized by an aniline cloud point within the range of about 10 or 15 to about 120, determined as subsequently indicated.

The characteristics of representative samples of aromatic oils which have been used with advantage are set forth in the following Table I.

TABLE I

| Sample | Method—A. S. T. M. | A | B | C | D | E | F | G | H |
|---|---|---|---|---|---|---|---|---|---|
| Gravity (A. P. I.) | D-287-39 | | 21.6 | 22.0 | 19.9 | 27.8 | 25.5 | 24.3 | 17.9 |
| Lbs./Gal. | | | 7.70 | 7.68 | 7.78 | 7.40 | 7.51 | 7.54 | |
| Aniline Cloud Point | D-611-46T | 51.8 | 37.9 | 35.0 | 102.2 | 104.5 | 96.6 | 92.7 | 14.7 |
| Diesel Index | | | 8.2 | 7.8 | 20.4 | 29.0 | 24.6 | 22.5 | |
| Carbon Residue: | | | | | | | | | |
| Ramsbottom—on 10% Residuum. | D-524-42 | .550 | | .516 | .162 | .243 | | | .132 |
| Conradsen on 10% Residuum. | D-189-46 | .607 | | .385 | .153 | .227 | | | .179 |
| Distillation: | | | | | | | | | |
| IBP—°F. | | | 386 | 345 | 412 | 390 | 416 | 438 | 186 |
| 10% Point | | | 430 | 416 | 444 | 456 | 476 | 482 | 455 |
| 90% Point | | | 538 | 508 | 514 | 570 | 569 | 569 | 548 |
| End Point | | | 628 | 574 | 574 | 600 | 596 | 598 | 602 |
| Recovery, Percent | | | 98.5 | 98.5 | 99.0 | 98.5 | 98.5 | 98.5 | 98.5 |
| Residue, Percent | | | 1.0 | 1.0 | 0.5 | 1.0 | 1.0 | 1.0 | 1.0 |
| Loss, Percent | | | 0.5 | 0.5 | 0.5 | 0.5 | 0.5 | 0.5 | 0.5 |

The entries in the foregoing table in the first column, headed Method—A. S. T. M., indicate the method prescribed by the American Society for Testing Materials used in determining the indicated characteristic of the oil.

The optimum extent of enrichment of the natural gas will depend somewhat upon the initial characteristics of the gas and the desired characteristics of the furnace black products. Using a natural gas of approximately 1,100 B. t. u. per cubic foot, we have, for example, obtained good results by adding to the make gas an oil such as described in proportions about 1.2 gallons of oil per thousand cubic feet of the natural gas. We have produced furnace carbons having a surface area of about 9 acres per pound and excellent rubber reinforcing characteristics by enriching the make gas to about 1,200 to 1,300 B. t. u., or by adding 0.5 gallon to 2 gallons of the oil per thousand cubic feet of natural gas. However, enrichment to 1,400 B. t. u. per cubic foot, and even higher, has been found desirable under certain conditions particularly in the production of somewhat coarser furnace carbons of higher structure ratings.

According to a further modification of the process, which may frequently be used with advantage in the production of certain furnace blacks, especially where the make gas is enriched by the addition of higher hydrocarbons such as described, we mix steam with the make gas, or enriched make gas just prior to its injection into the reaction chamber. By using this procedure, in conjunction with the make gas injection method herein described, we can increase the organic extractable content of the product and also increase its surface area.

Such addition of steam, not only promotes more rapid and uniform dispersion of the make gas in the blast flame gases but also appears to alter the nature of intermediate pyrolysis reactions. In addition, it retards coking of make gas tubes encountered with certain types of enrichment.

We have, with advantage, diluted the make gas with steam in proportions as high as 40% by volume, based on the volume of make gas measured at standard conditions. In the production of furnace carbon of the character desired for the use in the compounding of tire tread stock, about 15% steam has been used with particular advantage. However, proportions of steam, ever so small, assist in the uniform dispersion of the make gas in the blast flame gases and may be used with more or less advantage. Proportions of steam within the range of 15 to 40% are used, with advantage, in the manufacture of fine furnace blacks for use in the production of ink, and the like.

Figure 3:
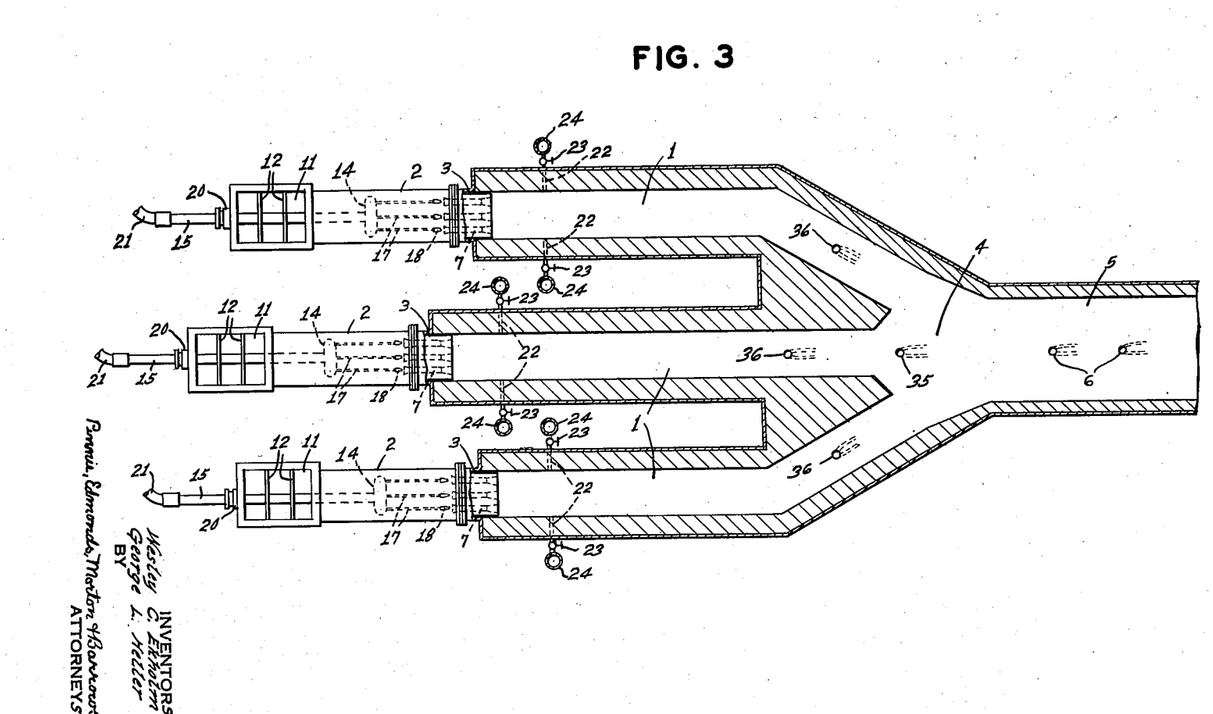
Figure 3 of the drawings represents a horizontal sectional view of the apparatus.

The process will be further described and illustrated by reference to Figures 3 to 5, inclusive, of the accompanying drawings, which represent conventionally and somewhat diagrammatically a particularly desirable embodiment of the invention in an operation comprising three reaction chambers opening at their downstream ends into a common blending chamber. It will be understood, however, that the invention is not restricted to the particular apparatus shown, but contemplates the use of a single reaction chamber and various types of apparatus adapted to carry out the process.

The unit comprises 3 reaction chambers 1, each provided at their forward end with a blast burner 2, the burner block 3 of which fits into the forward end of, and is coextensive with the transverse area of the chamber.

Each of the chambers at its downstream end opens into the common blending chamber 4 which, in turn, leads into an elongated, cylindrical chamber 5, in which the effluent from the blending chamber is cooled, as by means of water sprays 6, of which there may be a plurality spaced along the length of the chamber. The effluent from the chamber 5, which comprises a gaseous suspension of the furnace black, is passed to a collecting system, not shown in the drawing, for the recovery of the furnace black from the gases.

The chambers 1 are substantially uniform cross-sectional throughout and, in the particular apparatus illustrated, are approximately one foot wide and four feet high.

Figure 4:
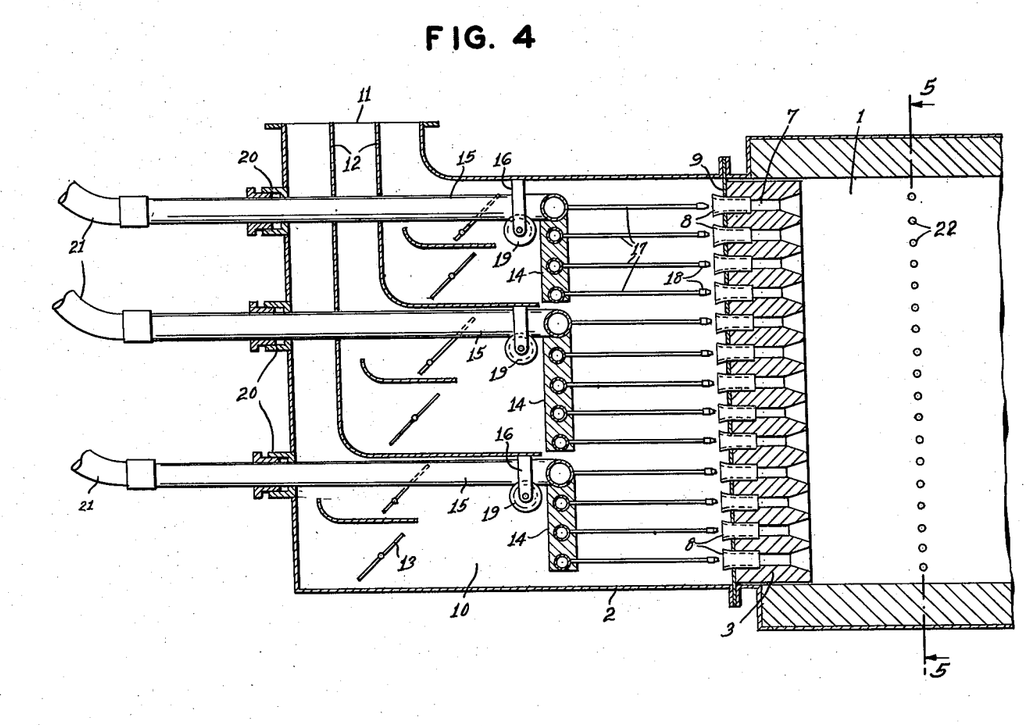
Figure 4 is a fragmentary vertical, longitudinal sectional view of the upstream end of a single reaction chamber, including the blast burner and make gas injection tubes.
Figure 5:
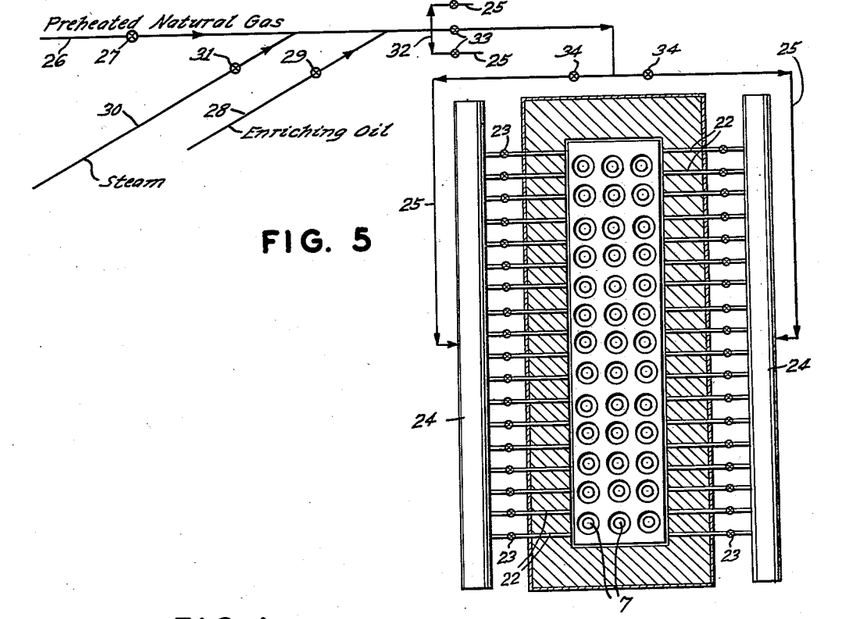
Figure 5 is a vertical, transverse sectional view, along the lines 5—5 of Figure 4.

Uniformly spaced over the face of the burner block are 39 burner ports 7, 1⅝ inches in diameter and flared at their inner ends to a diameter of three inches as more clearly appears in Figure 4 of the drawings. At their upstream end, the respective burner ports are provided with metal tubes 8, slightly flared at their inlet end and securely held in the burner ports by means of metal plate 9 to which they are fastened as by welding.

The respective burner ports open at their upstream end into the wind-box 10. Air for supporting combustion is forced under superatmospheric pressure into the upstream end of the wind-box, through air inlet 11, which is connected with a blower, or the like, not shown. Air is thus forced at high velocity through the respective burner ports. In order to secure uniform distribution of the combustion air, the wind-box is provided with a plurality of vanes 12 and adjustable dampers 13 for directing the air flow uniformly to higher and lower zones of the wind-box.

Also within the wind-box, there are three fuel gas manifolds 14 supported by the feed lines 15 and carriages 16. Extending downstream from the respective manifolds, coaxially with the burner ports is a plurality of tubes 17, each terminating at its downstream end in a jet or spud 18. Tubes 17 are of substantially greater length than the depth of the burner ports so that the respective burner ports may be moved forward to a position such that the spuds are at, or near, the downstream end of the burner ports without substantial interference by the manifolds with the flow of air into and through the burner ports.

The manifolds 14 are adapted to roll freely backward and forward over the carriages 16, equipped with flanged rollers 19, thus providing ready means for adjusting the position of the spuds with respect to the burner ports.

Each of the fuel gas manifold feed lines 15 extends to the rear through the vanes and rear wall of the wind-box through a packing gland 20 and is connected with a supply fuel gas, under pressure, through flexible tube 21. Advantageously, the lines 15 are calibrated just without the wind-box so that the position of the spuds with respect to the burner ports may be readily determined. Where a burner such as described is used, adjustment of blast flame conditions may be readily accomplished.

In operation, the blast burner is so regulated as to inject at high velocity through the respective burner ports a uniform combustible mixture of fuel gas and air which is burned as it leaves the ports within the reaction chamber forming a highly turbulent stream of blast flame gases which, by the time it has reached the make gas injection tubes 22, is of substantially uniform composition and is moving at a uniformly high linear velocity throughout the transverse area of the chamber.

The make gas is forcefully injected as a plurality of streams through make gas injection tubes 22 into the stream of hot blast flame gases at a zone advantageously one to five feet downstream from the face of the inner face of the burner block. In the particular apparatus shown, the make gas tubes are approximately 18 inches downstream from the burner block face.

As previously indicated, the size and number of the make gas injection tubes are subject to some variation. In the particular apparatus illustrated, 36 make gas injection tubes of ½ inch I. D. are provided, 18 on either side of the chamber and uniformly spaced over the height of the chamber, as more clearly appears from Figure 5 of the drawing. The outer ends of these tubes are provided with control valves 23 and are connected with make gas manifolds 24 to which the make gas is supplied under pressure through valved connections 25.

The make gas, usually natural gas, is supplied to the system, under pressure, through conduit 26 at a rate controlled by valve 27 and, as previously indicated, the gas is, with advantage, preheated by a conventional means, not shown in the drawing, to a temperature of about 700° F. Where make gas enrichment is employed, it may be injected into conduit 26 through line 28 at a rate controlled by valve 29. Where steam is to be mixed with a make gas, it may be injected into conduit 26 through line 30 at a rate controlled by valve 31. From conduit 26, the make gas, either alone or enriched, or admixed with steam, or both, is passed to manifold 32 and from thence through branch line 25 leading to the make gas manifolds 24, as previously described. Branched lines corresponding to line 25 lead from manifold 32 to the other reaction chambers of the unit. The amount of make gas passed to the respective manifolds of the several reaction chambers may be controlled by adjustment of the several valves 33 and valves 34 indicated in the branch lines and, by proper adjustment of these valves in conjunction with the valves 23 in the respective make gas injection tubes, the mass velocity of the respective make gas stream may be controlled and regulated.

The temperature at the forward end of the reaction chambers at the point of make gas injection is maintained at about 2,400 to 2,750° F., and the effluent gases entering the breeching will usually be at a temperature of about 2,100 to 2,450° F. In passing through the conduit 5, the gases will normally be colled to a temperature of about 900° F. Accordingly, the respective chambers are lined with an appropriately highly refractory material capable of withstanding these temperatures.

As previously indicated, it is frequently desirable to vary the contact time within a given apparatus. For this purpose, one or more water sprays may be provided within the blending chamber, as indicated at 35, and in the downstream end of the reaction chambers, as indicated at 36.

The following specific examples are given as illustrative of the present process and of the advantages attained thereby. Each of the operations described was carried out in apparatus substantially as shown in the accompanying drawings. In each instance, air for combustion was supplied at the rate of 405 thousand cubic feet per hour and fuel gas was supplied at the rate of 31.1 thousand cubic feet per hour. The B. t. u. value of the natural gas employed as the fuel gas and as the natural gas component of the make gas was approximately 1,100 per cubic foot.

*Example I*

In this operation, the make gas was composed of the natural gas supplied at the rate of 46.2 thousand cubic feet per hour, enriched by the addition of 56.6 gallons per hour of a #2 fuel oil primarily paraffinic and having an aniline cloud point of about 150. The calculated B. t. u. value of the enriched make gas was 1,250 per cubic foot. Prior to the injection of this enriched make gas into the reaction chamber, it was diluted by mixing with steam at the rate of 7.1 thousand cubic feet of steam per hour. The ratio of the mass velocity of the make gas streams to that of the blast flame gases was 8.4:1.

*Example II*

In this operation, the make gas was composed of the natural gas supplied at the rate of 45.2 thousand cubic feet per hour, enriched by the addition of 52.5 gallons per hour of a highly aromatic petroleum distillate having an aniline cloud point of 52. The calculated B. t. u. value of the enriched make gas was 1,242 per cubic foot. Prior to the injection of this enriched make gas into the reaction chamber, it was diluted by mixing with steam at the rate of 6.6 thousand cubic feet of steam per hour. The ratio of the mass velocity of the make gas streams to that of the blast flame gases was 7.3:1.

*Example III*

In this operation, the make gas was composed of the natural gas supplied at the rate of 41.5 thousand cubic feet per hour, enriched by the addition of 51 gallons per hour of an aromatic gas oil fraction having an aniline cloud point of 97. The calculated B. t. u. value of the enriched make gas was 1,250 per cubic foot. Prior to the injection of the enriched make gas into the reaction chamber, it was diluted by mixing with steam at the rate of 6.36 thousand cubic feet of steam per hour. The ratio of the mass velocity of the make gas streams to that of the blast flame gases was 6.8:1.

*Example IV*

In this operation, the make gas was composed of the natural gas supplied at a rate of 41.5 thousand cubic feet per hour, enriched by the addition of 51 gallons per hour of an aromatic gas oil fraction having an aniline cloud point of 93. The calculated B. t. u. value of the enriched make gas was 1,250 per cubic foot. Prior to the injection of this enriched make gas into the reaction chamber, it was diluted by mixing the steam at the rate of 6.36 thousand cubic feet of steam per hour. The ratio of the mass velocity of the make gas streams to that of the blast flame gases was 6.8:1.

*Example V*

In this operation, the make gas was composed of the natural gas supplied at the rate of 35.8 thousand cubic feet per hour, enriched by the addition of 90 gallons per hour of an aromatic gas oil having an aniline cloud point of from 20 to 50. The calculated B. t. u. value of the enriched make gas was 1,400 per cubic foot. The enriched make gas was injected into the reaction chamber without dilution with steam. The ratio of the mass velocity of the make gas streams to that of the blast flame gases was 6.1:1.

The yields and characteristics of the furnace carbons resulting, respectively, from the operations described in Examples I to V, inclusive, are set forth in the following table:

TABLE II

| Example | 1 | 2 | 3 | 4 | 5 |
|---|---|---|---|---|---|
| Color | 145 | 132 | 141 | 138 | 127 |
| Tinting Strength | 103 | | 111 | 107 | 105 |
| Oil Absorption | 10.7 | 12.7 | 13.0 | 13.0 | 14.3 |
| Surface Area, Acres per pound | 9.5 | 8.2 | 9.1 | 8.8 | 7.5 |
| Structure Index | 98 | 127 | 122 | 125 | 148 |
| Per Cent Extractable | .19 | .13 | .05 | .04 | |
| Yield—Lbs./M. C. F. Total Gas | 3.5 | 4.9 | 3.8 | 4.6 | 8.5 |

The yields set forth in the foregoing table are, as indicated, based on the total amount of hydrocarbon gas used including both that used as fuel gas and that used as a component of the make gas. Collection efficiency was estimated to be about 80%.

It will be observed that, in the foregoing examples, where a paraffinic enriching oil was used, the structure index of the product was 98. But where highly aromatic enriching oils, as indicated by the aniline cloud point test, were used, products having much higher structure indices were obtained.

It will be understood that the diameters of the make gas streams, referred to herein and in the appending claims, are the diameters of the streams as they enter the reaction chamber.

In the particular apparatus described and operations illustrated herein, the make gas injection tubes were spaced about 2½ inches between centers. However, as previously indicated, the optimum spacing of these tubes will vary somewhat with the inside diameters of the tubes and the mass velocities to be employed. Frequently, as the inside diameter of the make gas tubes approaches the upper permissible limit, the spacing between centers may be increased to about 5 inches. Where tubes of the smallest permissible diameter are used, they may frequently be arranged as close as 1½ inches between centers.

The apparatus herein disclosed is the subject of our copending application Ser. No. 16,586, filed concurrently herewith, now abandoned, and of co-pending application 181,424, a continuation of said Ser. No. 16,586.

We claim:

1. In the process for producing furnace black by decomposing hydrocarbons in which the hydrocarbons to be decomposed are forcefully injected into and intimately mixed with a turbulent stream of hot blast flame gases flowing at high linear velocity through an unobstructed and unconstricted reaction chamber, the improvement which comprises passing the hot blast flame gases as a turbulent stream of substantially uniform composition and linear velocity through a relatively narrow reaction chamber of rectangular cross-section, not exceeding 1½ feet in width and of substantially greater length, forcefully injecting the hydrocarbons to be decomposed into the stream of blast flame gases as a plurality of streams not exceeding ¾ inch and not less than ¼ inch in diameter uniformly spaced along the entire height of each side of the chamber, each stream being directed across the width of the chamber and near and equidistant from the upstream end of the chamber, the ratio of the mass velocity of the make gas streams to the mass velocity of the blast flame gases being within the range of 3:1 to 10:1.

2. In the process for producing furnace black by decomposing hydrocarbons in which the hydrocarbons to be decomposed are forcefully injected into and intimately mixed with a turbulent stream of hot blast flame gases flowing at high linear velocity through an unobstructed and unconstricted reaction chamber, the improvement which comprises passing the hot blast flame gases as a turbulent stream of substantially uniform composition and linear velocity through a relatively narrow reaction chamber of rectangular cross-section, not exceeding 1½ feet in width and of substantially greater length, forcefully injecting the hydrocarbons to be decomposed into the stream of blast flame gases as a plurality of streams not exceeding ¾ inch and not less than ¼ inch in diameter, uniformly spaced along the entire height of each side of the chamber, each stream being directed across the width of the chamber and directly opposite a stream directed from the opposite side of the chamber and each being near and equidistant from the upstream end of the chamber, the ratio of the mass velocity of the make gas streams to the mass velocity of the blast flame gases being within the range of 3:1 to 10:1.

3. In the process for producing furnace black by decomposing hydrocarbons in which the hydrocarbons to be decomposed are forcefully injected into and intimately mixed with a turbulent stream of hot blast flame gases flowing at high linear velocity through an unobstructed and unconstricted reaction chamber, the improvement which comprises passing the hot blast flame gases as a turbulent stream of substantially uniform composition and linear velocity through a relatively narrow reaction chamber of rectangular cross-section, not exceeding 1½ feet in width and of substantially greater length, forcefully injecting the hydrocarbons to be decomposed, comprising natural gas enriched by the addition thereto of vapors of a higher boiling hydrocarbon fraction having an end point not exceeding 725° F. in proportions such as to increase the B. t. u. value of the make gas to 1,200 to 1,400 per cubic foot of the enriched gas, into the stream of blast flame gases as a plurality of streams not exceeding ¾ inch and not less than ¼ inch in diameter, uniformly spaced along the entire height of each side of the chamber, each stream being directed across the width of the chamber and directly opposite a stream directed from the opposite side of the chamber and each being near and equidistant from the upstream end of the chamber, the ratio of the mass velocity of the make gas streams to the mass velocity of the blast flame gases being within the range of 3:1 to 10:1.

4. In the process for producing furnace black by decomposing hydrocarbons in which the hydrocarbons to be decomposed are forcefully injected into and intimately mixed with a turbulent stream of hot blast flame gases flowing at high linear velocity through an unobstructed and unconstricted reaction chamber, the improvement which comprises passing the hot blast flame gases as a turbulent stream of substantially uniform composition and linear velocity through a relatively narrow reaction chamber of rectangular cross-section, not exceeding 1½ feet in width and of substantially greater length, forcefully injecting the hydrocarbons to be decomposed, comprising natural gas enriched by the addition thereto of vapors of a higher boiling hydrocarbon fraction containing a relatively large proportion of aromatic constituents and having an end point not exceeding 725° F. in proportions such as to increase the B. t. u. value of the make gas to 1,200 to 1,400 per cubic foot of the enriched gas into the stream of blast flame gases as a plurality of streams not exceeding ¾ inch and not less than ¼ inch in diameter, uniformly spaced along the entire height of each side of the chamber, each stream being directed across the width of the chamber and directly opposite a stream directed from the opposite side of the chamber and each being near and equidistant from the upstream end of the chamber, the ratio of the mass velocity of the make gas streams to the mass velocity of the blast flame gases being within the range of 3:1 to 10:1.

5. The process of claim 4 in which the make gas is diluted by the addition of steam.

6. The process of claim 4 in which an enriching oil is used having an aniline cloud point within the range of 10 to 120.

7. The process of claim 6 in which the make gas is diluted by the addition of steam.

8. In the process for producing furnace black by decomposing hydrocarbons in which the hydrocarbons to be decomposed are forcefully injected into and intimately mixed with a turbulent stream of hot blast flame gases flowing at high linear velocity through an unobstructed and unconstricted reaction chamber, the improvement which comprises passing the hot blast flame gases as a turbulent stream of substantially uniform composition and linear velocity through a relatively narrow reaction chamber of rectangular cross-section, not exceeding 1½ feet in width and of substantially greater length, forcefully injecting the hydrocarbons to be decomposed, comprising natural gas enriched by the addition thereto of vapors of a higher boiling hydrocarbon fraction having an end point not exceeding 725° F. in proportions such as to increase the B. t. u. value of the make gas to 1,200 to 1,400 per cubic foot of the enriched gas and diluted by the addition of steam in a proportion within the range of 15% to 40%, based on the volume of the natural gas, into the stream of blast flame gases as a plurality of streams not exceeding ¾ inch and not less than ¼ inch in diameter, uniformly spaced along the entire height of each side of the chamber, each stream being directed across the width of the chamber and directly opposite a stream directed from the opposite side of the chamber and each being near and equidistant from the upstream end of the chamber, the ratio of the mass velocity of the make gas streams to the mass velocity of the blast flame gases being within the range of 3:1 to 10:1.

9. In the process for producing furnace black by decomposing hydrocarbons in which the hydrocarbons to be decomposed are forcefully injected into and intimately mixed with a turbulent stream of hot blast flame gases flowing at high linear velocity through an unobstructed and unconstricted reaction chamber, the improvement which comprises blasting a combustible gas mixture into one end of a relatively narrow reaction chamber of rectangular cross-section, not exceeding 1½ feet in width and of substantially greater length, as a plurality of streams not exceeding two inches in diameter, uniformly spaced over the entire transverse area of the chamber and having an aggregate transverse area of about 25% the entire transverse area of the chamber, burning the combustible mixture as it enters the reaction chamber to form a turbulent stream of blast flame gases of substantially uniform composition and linear velocity, forcefully injecting the hydrocarbon to be decomposed into the stream of blast flame gases as a plurality of streams not exceeding ¾ inch and not less than ¼ inch in diameter uniformly spaced along the entire height of each side of the chamber, each stream being directed across the width of the chamber and near and equidistant from the upstream end of the chamber, the ratio of the mass velocity of the make gas streams to the mass velocity of the blast flame gases being within the range of 3:1 to 10:1.

10. In the process for producing furnace black by decomposing hydrocarbons in which the hydrocarbons to be decomposed are forcefully injected into, and intimately mixed with, a turbulent stream of hot blast flame gases flowing at high velocity through an unobstructed and unconstricted reaction chamber, the improvement which comprises passing the hot blast flame gases as a turbulent stream of substantially uniform composition and linear velocity through a relatively narrow reaction chamber of rectangular cross-section, not exceeding 1½ feet in width and of substantially greater length, forcefully injecting the hydrocarbon to be decomposed into the stream of blast flame gases as a plurality of streams, uniformly spaced along the entire height of each side of the chamber, each stream being directed across the width of the chamber and directly opposite a stream directed from the opposite side of the chamber and each being near and equidistant from the upstream end of the chamber, the trajectory of the make gas streams being such that opposite streams just meet at the mid point of the chamber without substantial overlapping.

11. The process of claim 10 in which the make gas is diluted by the addition of steam.

12. In the process for producing furnace black by decomposing hydrocarbons in which the hydrocarbons to be decomposed are forcefully injected into and intimately mixed with a turbulent stream of hot blast flame gases flowing at high linear velocity through an unobstructed and unconstricted reaction chamber, the improvement which comprises passing the hot blast flame gases as a turbulent stream of substantially uniform composition and linear velocity through a relatively narrow reaction chamber of rectangular cross-section, not exceeding 1½ feet in width and of substantially greater length, forcefully injecting the hydrocarbons to be decomposed, comprising natural gas enriched by the addition thereto of vapors of a higher boiling hydrocarbon fraction having an end point not exceeding 725 F. in proportions within the range of 0.5 gallons to 2 gallons per thousand cubic feet of the enriched gas, into the stream of blast flame gases as a plurality of streams not exceeding ¾ inch and not less than ¼ inch in diameter, uniformly spaced along the entire height of each side of the chamber, each stream being directed across the width of the chamber and directly opposite a stream directed from the opposite side of the chamber and each being near and equidistant from the upstream end of the chamber, the ratio of the mass velocity of the make gas streams to the mass velocity of the blast flame gases being within the range of 3:1 to 10:1.

13. The process of claim 12 in which the make gas is diluted by the addition of steam.

14. In the process for producing furnace black by decomposing hydrocarbons in which the hydrocarbons to be decomposed are forcefully injected into and intimately mixed with a turbulent stream of hot blast flame gases flowing at high linear velocity through an unobstructed and unconstricted reaction chamber, the improvement which comprises passing the hot blast flame gases as a turbulent stream of substantially uniform composition and linear velocity through a relatively narrow reaction chamber of rectangular cross-section, 12 to 14 inches wide and of substantially greater length, forcefully injecting the hydrocarbons to be decomposed into the stream of blast flame gases as a plurality of streams not exceeding ¾ inch and not less than ¼ inch in diameter uniformly spaced along the entire height of each side of the chamber, each stream being directed across the width of the chamber and near and equidistant from the upstream end of the chamber, the ratio of the mass velocity of the make gas streams to the mass velocity of the blast flame gases being within the range of 3:1 to 10:1.

WESLEY C. EKHOLM.
GEORGE L. HELLER.

REFERENCES CITED

The following references are of record in the file of this patent:

UNITED STATES PATENTS

| Number | Name | Date |
| --- | --- | --- |
| 2,138,249 | Wilcox | Nov. 29, 1938 |
| 2,163,630 | Reed | June 27, 1939 |
| 2,375,796 | Krejci | May 15, 1945 |
| 2,378,055 | Wiegand et al. | June 12, 1945 |
| 2,440,423 | Wiegand et al. | Apr. 27, 1948 |
| 2,440,424 | Wiegand et al. | Apr. 27, 1948 |
| 2,499,438 | Wiegand et al. | Mar. 7, 1950 |
| 2,516,134 | Molique | July 25, 1950 |